United States Patent [19]
Heffner

[11] Patent Number: 5,227,623
[45] Date of Patent: Jul. 13, 1993

[54] METHOD AND APPARATUS FOR MEASURING POLARIZATION MODE DISPERSION IN OPTICAL DEVICES

[75] Inventor: Brian L. Heffner, Redwood City, Calif.

[73] Assignee: Hewlett-Packard Company, Palo Alto, Calif.

[21] Appl. No.: 829,994

[22] Filed: Jan. 31, 1992

[51] Int. Cl.$^5$ .............................................. G02F 1/01
[52] U.S. Cl. .................................... 250/225; 356/364
[58] Field of Search ........................... 250/225, 227.17; 356/364, 365, 366, 367, 73.1

[56] References Cited

U.S. PATENT DOCUMENTS

| | | | |
|---|---|---|---|
| 4,158,506 | 6/1979 | Collett | 356/365 |
| 4,306,809 | 12/1981 | Azzan | 356/365 |
| 4,671,657 | 6/1987 | Calvani et al. | 356/351 |
| 4,671,660 | 6/1987 | Distl et al. | 356/357 |
| 4,681,450 | 7/1987 | Azzam | 356/367 |
| 4,709,145 | 11/1987 | Spillman, Jr. | 250/225 |
| 4,750,833 | 6/1988 | Jones | 356/73.1 |
| 4,904,085 | 2/1990 | Spillman, Jr. et al. | 250/225 |
| 4,999,014 | 3/1991 | Gold et al. | 356/382 |
| 5,081,348 | 1/1992 | Siddiqui | 250/225 |

Primary Examiner—David C. Nelms
Assistant Examiner—John R. Lee
Attorney, Agent, or Firm—William C. Milks, III

[57] ABSTRACT

An instrument includes a polarized optical source for producing three sequential predetermined states of polarization of a light beam at each of at least two wavelengths, as well as an optical polarization meter for measuring the polarization of a portion of the light beam at each wavelength transmitted by or reflected from an optical network by splitting it into four beams, passing three of the beams through optical elements, measuring the transmitted intensity of all four beams, and calculating Stokes parameters. The three sequential predetermined states of polarization at each wavelength yield three corresponding Jones input vectors at each wavelength, and the Stokes parameters for the responses of the optical network are converted to three Jones output vectors at each wavelength. A Jones matrix for the optical network to within a complex constant is then computed from the Jones input and output vectors at each wavelength. Polarization mode dispersion in the optical network is determined from these matrices.

7 Claims, 10 Drawing Sheets

METHOD AND APPARATUS FOR MEASURING POLARIZATION MODE DISPERSION IN OPTICAL DEVICES

BACKGROUND OF THE INVENTION

This invention relates to the field of electronic instruments for measuring the polarization state of a beam of light and, more particularly, to such instruments that are capable of detecting effects on the polarization state of an incident light beam caused by an optical device under test (i.e., an optical system, subsystem, or component). Specifically, one embodiment of the invention provides a method and apparatus for impinging light beams having predetermined wavelengths and states of polarization on an optical device under test to ascertain a response characteristic of the optical device to different polarization states, thereby determining the polarization mode dispersion in the optical device.

Accurate characterization of optical devices is becoming increasingly important as optical devices become more complex and applications for optical devices proliferate, for example, in fiber optic telecommunications. One of the fundamental specifications of any optical device with an optical input and an optical output is polarization dispersion. Dispersion is a general term which denotes the tendency of an optical pulse to spread out in time as it propagates through an optical transmission medium. Several varieties of dispersion can be measured in optical fibers. For example, chromatic dispersion arises because different optical wavelengths travel at different velocities, so that a pulse comprising a finite spectrum of optical frequencies is gradually smeared out in time by propagation along an optical fiber. Similarly, polarization mode dispersion arises because different optical polarizations can travel at different velocities. Polarization mode dispersion can limit the available transmission bandwidth in fiber optic transmission links.

Conventionally, one technique for measuring polarization mode dispersion involves a device resembling a Michelson interferometer, shown in FIG. 1 and in K. Mochizuki, Y. Namihira, and H. Wakabayashi, "Polarization mode dispersion measurements in long single mode fibers," Elect. Lett., 17, 1981, pp. 153-154. Light from a source with a short coherence length is directed through an arrangement of mirrors, polarizers, and a beamsplitter which enables generation of a beam of light composed of two orthogonal polarizations which have experienced a variable relative time delay. These two polarizations are launched into the device under test so that they match the input principal states of polarization of the device. Light exiting the device is passed through a polarizer oriented midway between the output principal states of polarization and is then detected. Cross-correlation between the two orthogonal signals is thereby apparent from the level of visibility of optical fringes at the detector. Polarization mode dispersion in the device under test causes a shift in the delay corresponding to maximum visibility, and this time shift is $\tau_{PMD}$.

However, this technique has several disadvantages. The principal states of polarization must be known or found for this technique to work, but the apparatus does not lend itself to a search for the principal states. Moreover, the requirement of a short coherence length implies a broad spectrum. Many test devices of interest have principal states and $\tau_{PMD}$ which are strong functions of wavelength, and such devices simply cannot be measured using this technique because the required short coherence length of the optical source implies a wide spectrum.

A second polarization mode dispersion measurement technique requires a tunable optical source and a polarimeter. The setups described in two references, N. S. Bergano, C. D. Poole, and R. E. Wagner, "Investigation of polarization dispersion in long lengths of single-mode fiber using multilongitudinal mode lasers," IEEE J. Lightwave Technol., LT-5, 1987, pp. 618-1622, and D. Andresciani, F. Curti, F. Matera, and B. Daino, "Measurement of the group-delay difference between the principal states of polarization on a low-birefringence terrestrial fiber cable," Optics Lett. 12, 1987, pp. 844-846, are reproduced in FIGS. 2 and 3, respectively. The output state of polarization is measured and displayed on a Poincare sphere. As the optical source is tuned over a range of frequencies, the output state of polarization traces out an arc on the sphere. Assuming that the principal states and $\tau_{PMD}$ are fairly constant over the frequency range, the principal states are located at the center of the arc and diametrically opposite, and $\tau_{PMD} = \alpha/\Delta\omega$, where $\alpha$ is the arc between two output states of polarization separated by $\Delta\omega$, and $\alpha$ is measured about the axis joining the two principal states of polarization.

This technique also suffers several disadvantages. Again, the principal states of polarization must be found for this technique to work. Finding the principal states is time-consuming and very difficult to automate. If $\tau_{PMD}$ is small over a particular frequency interval, the arc traced out will be too small to indicate its center, making this technique unusable.

A third technique for measuring polarization mode dispersion, described in C. D. Poole, "Measurement of polarization-mode dispersion in single-mode fibers with random mode coupling," Optics Lett., 14, 1989, pp. 523-525, involves an apparatus such as that reproduced in FIG. 4. In use, the photocurrent is measured as a function of the optical frequency selected by the monochrometer. Quoting from this reference, Poole shows that "if the [polarization] dispersion is both stationary and ergodic, the density of the extrema in the transmission spectrum is directly related to the ensemble average delay " $<\tau_{PMD}>$. Under these assumptions, the ensemble average delay time is given by $$<\tau_{PMD}> = \pi \lim_{\Delta\omega \to \infty} \frac{N}{\Delta\omega}, \quad (1)$$

where N is the number of extrema observed in the interval $\Delta\omega$ in the photocurrent versus optical frequency plot.

This technique has the disadvantage that it is applicable only when the polarization mode dispersion is stationary and ergodic. These conditions are often satisfied when measuring polarization mode dispersion in a long single-mode optical fiber, but they are not generally satisfied for all devices or networks, for example, a pigtailed isolator or integrated-optic device. Nevertheless, even when the conditions are satisfied, this technique does not indicate the principal states of polarization, and yields poor resolution in the measured value of $<\tau_{PMD}>$.

Finally, another known polarization mode dispersion measurement technique disclosed in C. D. Poole, N. S.

Bergano, R. E. Wagner, and H. J. Schulte, "Polarization dispersion and principal states in a 147-km undersea lightwave cable," IEEE J. Lightwave Technol., LT-6, 1988, pp. 1185-1190, uses the apparatus shown in FIG. 5. Note that this apparatus is identical in function to that of the technique described in connection with FIGS. 2 and 3 above, except that a polarization controller is inserted between the tunable source and the device under test, in this case a 147-km cable. In this context, a polarization controller is an arrangement of loops of single-mode optical fiber, which can be manually adjusted to change its polarization transformation, allowing the user to generate at the output of the loops any desired state of polarization within the constraint that the degree of polarization cannot be changed by the loops; See H. C. LeFevre, "Single-mode fibre fractional wave devices and polarization controllers," Elect. Lett., 16, 1980, pp. 778-780.

In use, the optical source is tuned to approximately measure the derivative $ds_1/d\omega$, where $s_1$ is the normalized Stokes vector representing the state of polarization at the output of the device under test. The polarization controller is then adjusted to generate a new output state of polarization $s_2$, and the optical source is retuned over exactly the same range to approximately measure $ds_2/d\omega$. The desired characteristics of polarization mode dispersion can be derived from the vector q given by $$q = \frac{\frac{ds_1}{d\omega} \times \frac{ds_2}{d\omega}}{\frac{ds_1}{d\omega} \cdot s_2}. \quad (2)$$

The normalized Stokes vectors p representing the output principal states are given by $p = \pm q/|q|$, and $\tau_{PMD} = |q|$.

However, this technique suffers the disadvantage that large errors in the calculation of q will occur when $s_1$ or $s_2$ is near one of the output principal states, and also when the cross product in Equation (2) is small.

Therefore, a method and apparatus for facilitating determination of polarization mode dispersion in an optical device under test to various polarization states of an incident light beam are needed so that the response characteristic of the optical device to different polarization states can be assessed, for example, during the design of the optical device. Moreover, such a polarization mode dispersion determination desirably would be calibrated, accurate, and rapidly obtained, as well as convenient to perform.

SUMMARY OF THE INVENTION

It is an object of this invention to provide an instrument that is capable of generating different states of polarization of a light beam and measuring the polarization states produced by the effect of an optical device under test on the beam to enable polarization mode dispersion in the optical device to be determined.

Another object is to provide an instrument that determines such polarization mode dispersion over a substantial range of wavelengths.

A further object of the invention is to provide an instrument for determining polarization mode dispersion that makes it convenient to calibrate out the effects of unwanted dispersive elements in the measurement system.

One embodiment of the present invention provides a method and apparatus for determining polarization mode dispersion in an optical device under test using a polarized optical source, which provides at least two optical wavelengths and at least three states of polarization at each wavelength, as well as an optical polarization meter. The method in accordance with one embodiment of the invention measures the responses of an optical device under test to a first incident light beam by providing a light beam having a first optical wavelength with three sequential polarization states, corresponding to three Jones input vectors, impinging the first beam on the optical device, and measuring the state of polarization of the transmitted or reflected beam. This state of polarization can be measured by splitting the transmitted or reflected beam into four beams, passing three of the beams through optical elements, and measuring the intensities of all four beams by means of photodetectors. This process is then repeated with a second incident light beam having a second optical wavelength. The Stokes parameters are then calculated from the results of these measurements and converted to Jones output vectors. The Jones matrix for the optical device under test is then computed at each wavelength to within a complex constant. Thereafter, the relative polarization mode dispersion in the optical device under test can be determined from these matrices.

Preferably, an optical source is connected to a polarization synthesizer which is used to sequentially transform the state of polarization of each of the light beams having different wavelengths generated by the optical source to three known states of polarization, for example, horizontal, 60-degree, and 120-degree linear polarization states. The three states of polarization need not be of the same intensity. The light beams produced by the polarization synthesizer are fed to the optical device under test having unknown Jones matrices. The light beams are impinged on the optical device under test, and the transmitted or reflected portion of each light beam is routed to the optical polarization meter which measures the state of polarization. The optical polarization meter need not measure optical power.

The optical device under test can be situated in an open beam. Alternatively, connections can be effected with single-mode optical fiber.

In the optical polarization meter, the received portion of the light beam is subdivided into four beams and processed by three sets of optical elements. One of the optical elements is a horizontal linear polarizer, the second is a linear polarizer with a polarization direction oriented at a 45-degree angle about the optical axis relative to the first, and the third element is a circular polarizer. Measurement of the fourth beam provides a normalizing factor proportional to the total incident intensity, that enables determination of all four Stokes parameters. The received portion of each of the two light beams preferably enters the optical polarization meter through a single-mode optical fiber that acts as a spatial filter which, together with other optical elements, controls the position and alignment of the received portion of the light beam in the optical polarization meter.

The three known sequential input states of polarization produced by the polarization synthesizer for each of the light beams yield three Jones input vectors for each light beam. The Stokes parameters for the response of the optical device to each of three sequential polarization states of each light beam are converted to three corresponding Jones output vectors. The Jones matrix for the optical device under test in response to each light beam is then computed to within a complex constant from the Jones input and output vectors. Finally, polarization mode dispersion can be determined from these matrices for the optical device under test.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings.

DETAILED DESCRIPTION OF THE PREFERRED EMBODIMENTS

Figure 6:
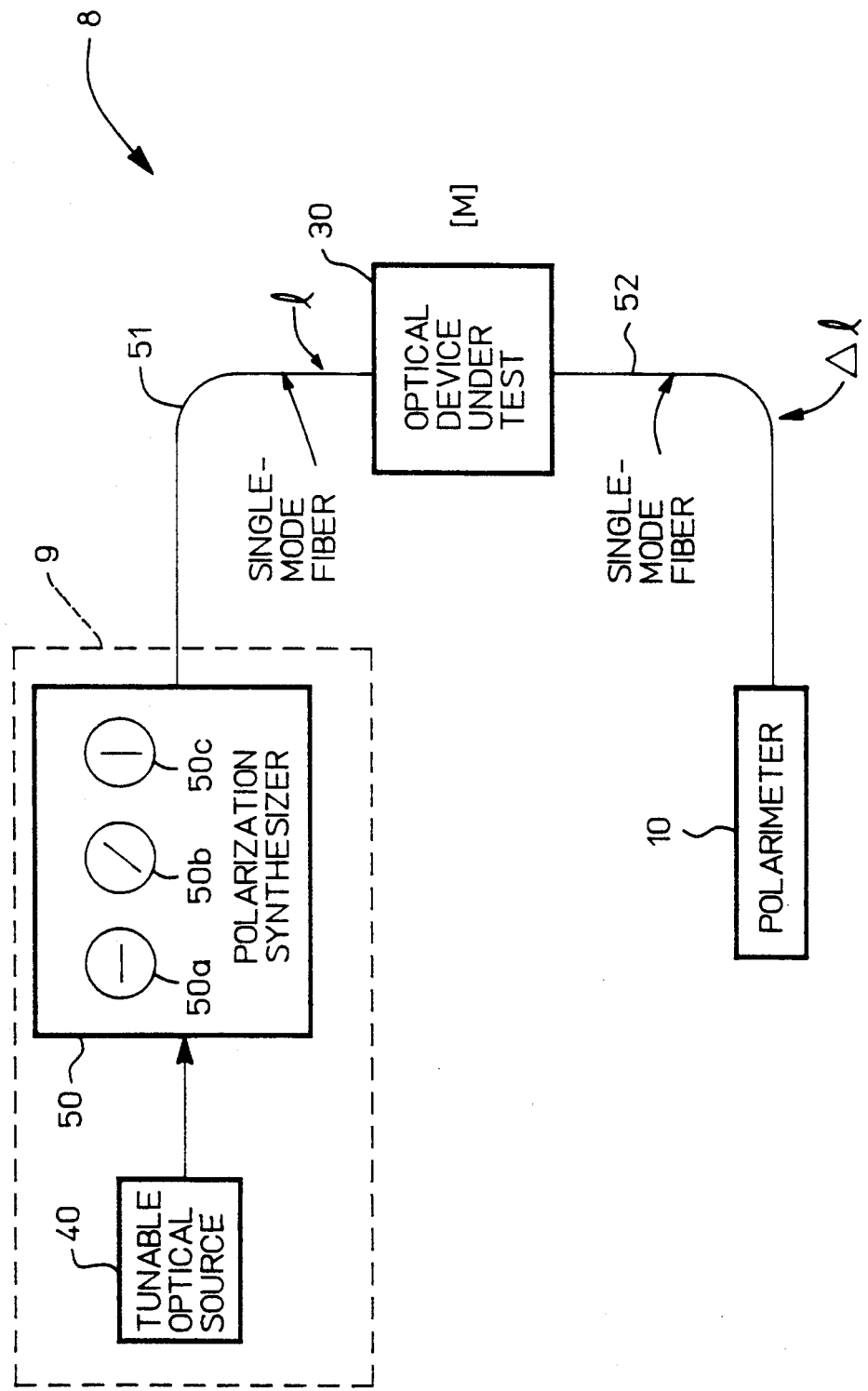
FIG. 6 is a schematic diagram of an instrument for determining the polarization mode dispersion in an optical device under test in accordance with the invention based on transmission measurements.

One embodiment of an instrument for achieving calibrated, accurate, convenient polarization mode dispersion determinations in accordance with the invention, generally indicated by the numeral 8, is shown in FIG. 6. The instrument 8 comprises a polarized optical source 9 for feeding a light beam 1 to an optical device under test (DUT) 30, and an optical polarization meter 10 for receiving a portion of the light beam $\Delta l$ transmitted by the optical DUT. Actually, the polarized optical source 9 can comprise an optical source 40 and a polarization synthesizer 50, as indicated by the dashed lines around these elements in FIG. 6. For example, the optical source 40 can be one or more solid-state lasers which generate light beams having different given wavelengths such as 1300 nanometers and 1302 nanometers. These wavelengths can be achieved using a tunable laser, for example, or, alternatively, a laser or other light source having a broad spectrum and a monochrometer to select the wavelengths. Conceptually, the polarization mode dispersion determination in accordance with the invention is more understandable when it is described using two sequential light beams, but a broad spectrum light source can be used to simultaneously illuminate the DUT 30 with light having a broad spectrum of wavelengths and a monochrometer can be used anywhere in the measurement chain to select the wavelength to be measured by the polarization meter 10.

The polarization synthesizer 50 is preferably automated to sequentially insert three different polarizers 50a, 50b, and 50c into the path of the light beam generated by the optical source 40 to produce three sequential states of polarization of the light beam 1. Conveniently, the polarizers 50a, 50b, and 50c preferably transmit linear polarization states, but, alternatively, they can be selected to transmit elliptical states of polarization. Other polarization generators can also be used, including a variable or rotatable waveplate.

Figure 7:
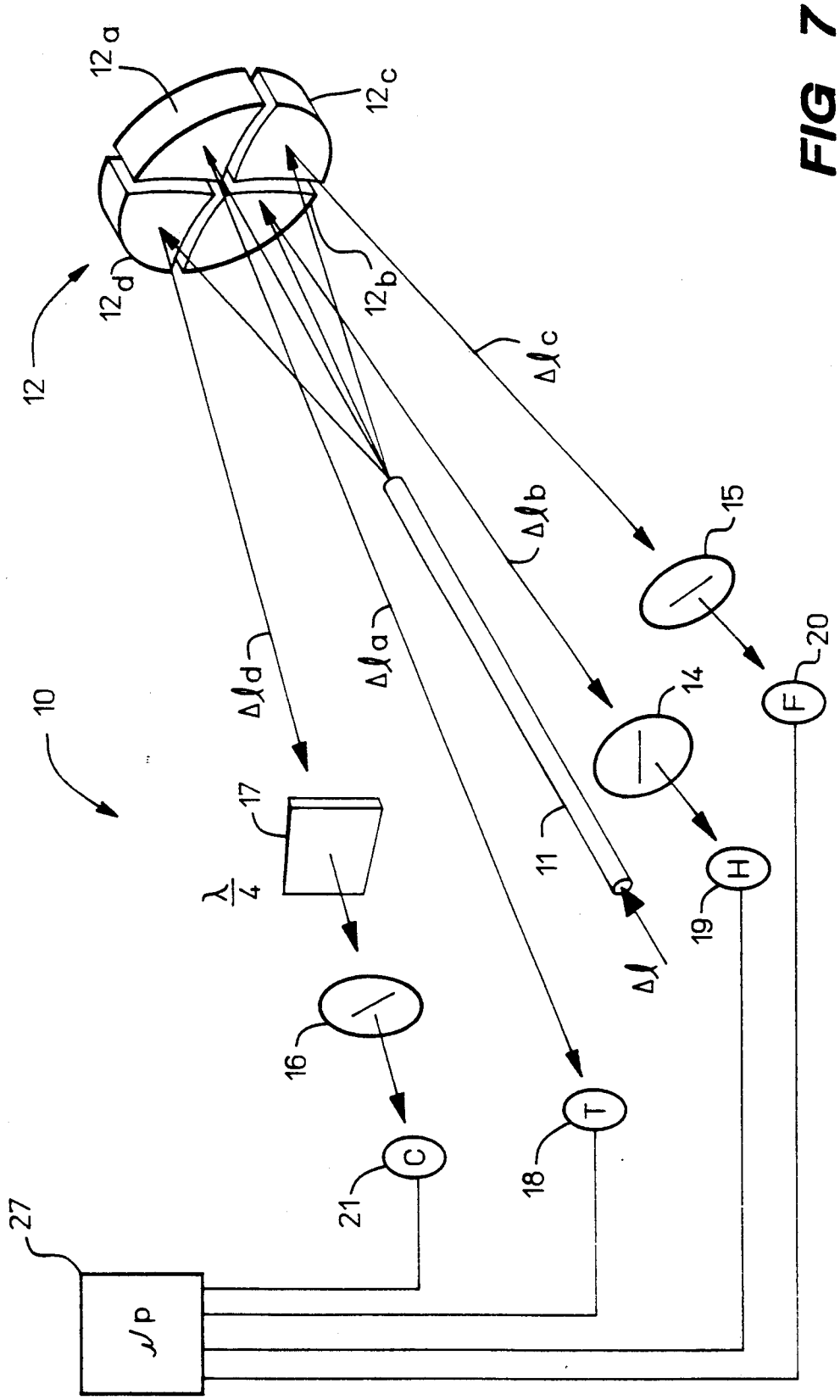
FIG. 7 is a schematic diagram in perspective view of an optical polarization meter incorporated into the instrument shown in FIG. 6, illustrating the optical path of the received portion of the light beam from an optical device under test.

As shown in FIG. 7, the portion of the light beam $\Delta l$ transmitted by the optical DUT 30 shown in FIG. 6 enters the optical polarization meter 10 through a single-mode optical fiber 11, which provides spatial filtering of the beam. A method for calibrating to correct for the distortion of the polarization state caused by the input optical fiber 11 by using no more than two reference light beams of known polarization is described in copending U.S. patent application Series Code/Ser. No. 07/755,931 filed on Sep. 6, 1991, and assigned to the same assignee as this application, the disclosure of which is hereby incorporated by reference in its entirety.

The optical polarization meter 10 can operate in the range of wavelengths over which the input optical fiber 11 supports a single mode of propagation. For example, a standard long-haul telecommunications fiber manufactured by Corning Glass for 1.3-micron transmission can support a single propagation mode over the wavelength range of 1.2 –1.6 micrometers.

The light beam $\Delta l$ proceeds into a focusing concave mirror 12 sectioned into independently movable quadrants 12a, 12b, 12c, and 12d. The efficiency and accuracy of the optical polarization meter 10 are enhanced by the spatial filtering function of the input optical fiber 11 which ensures that the light beam $\Delta l$ is repeatably distributed among the quadrants 12a–12d. The focusing concave mirror 12 splits the beam into four separate beams, as shown in FIG. 7. The four beams are sufficiently separated to allow different optical elements to be placed in their path. The beams are denoted by "$\Delta la$," "$\Delta lb$," "$\Delta lc$," and "$\Delta ld$."

The beam labelled "$\Delta lb$" passes through a linear polarizer 14 having a horizontal polarization axis. Beam "$\Delta lc$" passes through a linear polarizer 15 having a polarization axis oriented at a 45-degree angle about the optical axis relative to the linear polarizer 14. Beam "$\Delta ld$" passes through a quarter-wave plate 17, and then through a linear polarizer 16 that is oriented in the same direction as the linear polarizer 15; this combination is a circular polarizer. Finally, beam "a" has no optical elements in its path. The four beams"$\Delta la$"–"$\Delta ld$" impinge on a respective photodetector 18, 19, 20, or 21 and are substantially absorbed. Each photodetector 18–21 produces an electrical signal that is proportional to the intensity of the optical energy absorbed. The photodetector 18 produces a signal of amplitude T, photodetector 19 produces a signal H, photodetector 20 produces a signal F, and photodetector 21 produces a signal C. The measurement frequency of the optical polarization meter 10 is limited only by the frequency response of the photodetectors 18–21, which can easily exceed 1 GHz.

Each quadrant 12a–12d of the focusing concave mirror 12 is adjusted to focus the portion of the light beam Δl impinging on it onto the corresponding photodetector 18–21 either directly or through the optical elements 14–17, as the case may be. The adjustment mechanism for the quadrant mirror sections 12a–12d is not shown, since it can be constructed readily by persons of skill in the field of the invention.

The electrical signals produced by the photodetectors 18–21 are routed to a microprocessor 27 having an analog-to-digital converter circuit. The amplitude of the electrical signals produced by the photodetectors 18–21 can be used to determine the Stokes parameters of the portion of the light beam transmitted by the optical DUT 30 shown in FIG. 6. For purposes of this description, definition of the Stokes parameters is based on the well-known treatise entitled Principles of Optics, by M. Born and E. Wolf (Pergamon Press, 4th Edition, London, 1970, pages 30–32). These parameters are denoted by the symbols "$s_0$," "$s_1$," "$s_2$," and "$s_3$," and specification of all four of these quantities, based on the known configuration of the optical elements 14–17 and the intensities measured by the photodetectors 18–21, determines the state of polarization of the light beam Δl. The electrical signals T, H, F, and C produced by the photodetectors 18–21 are related to the Stokes parameters by the expressions:

$$s_0 = T; \quad (3)$$
$$s_1 = 2H - T; \quad (4)$$
$$s_2 = 2F - T; \quad (5)$$
$$s_3 = 2C - T. \quad (6)$$

The Stokes parameter $s_0$ is simply the total light intensity. The Stokes parameters $s_1$, $s_2$, and $s_3$ are determined from the electrical signals produced by the photodetectors 18–21 by Equations (4) (6). The degree of polarization is given by the expression: (7)

$$D = \frac{\sqrt{s_1^2 + s_2^2 + s_3^2}}{s_0}. \quad (7)$$

Such calculations can be carried out automatically by the microprocessor 27 shown in FIG. 7.

The method for determining polarization mode dispersion in accordance with the invention applies to any optical network. For the purposes of the following description, determination of polarization mode dispersion in the optical DUT 30 shown in FIG. 6 will be described for the case entailing measurements of transmission of the light beam through the optical DUT. Alternatively, measurements of reflection can be performed instead of transmission measurements by employing a beam splitter or directional coupler, as will be briefly described later.

By way of background, in microwave networks where polarization is not an issue, and in optical devices and networks in which polarization is known not to vary, signals can be represented as scalars instead of vectors. In this case, a linear, time-invariant device or network is characterized by a complex frequency response $H(\omega)$ which relates the input frequency spectrum $X(\omega)$ to the output spectrum $y(\omega)$, such that $y(\omega) = H(\omega) X(\omega)$. The magnitude and phase of the frequency response can be separated by writing $H(\omega) = \sigma(\omega) \exp[i\phi(\omega)]$, where $\sigma$ and $\phi$ are real functions of $\omega$. $\phi$ can be expanded in a Taylor series about $\omega_0$ as follows:

$$\phi(\omega) = \phi(\omega_0) + \frac{d\phi(\omega_0)}{d\omega}(\omega - \omega_0) + \frac{d^2\phi(\omega_0)}{d\omega^2}(\omega - \omega_0)^2 + \ldots, \quad (7)$$

where the derivatives of $\phi(\omega)$ are taken before being evaluated at $\omega_0$. For small variations from $\omega_0$ the following first order approximation holds:

$$H(\omega) \approx \sigma(\omega)\exp[i\phi(\omega_0) + i\tau_g(\omega - \omega_0)], \quad (8)$$

where $d\phi/d\omega$ is given the name group delay and replaced by the term $\tau_g$. The group delay is sometimes referred to as the propagation delay because it is the time delay suffered by a pulse propagates through the device or network in question. Later use will be made of the special case when the input spectrum is constant over a range of frequencies, leading to $x(\omega) = x(\omega + \Delta\omega)$ and $$y(\omega + \Delta\omega) = \frac{h(\omega + \Delta\omega)}{H(\omega)} y(\omega) = \frac{\sigma(\omega + \Delta\omega)}{\sigma(\omega)} e^{i\tau_g \Delta\omega} y(\omega). \quad (9)$$

Note that in devices and networks where time delay is the dominant mechanism of phase variation, the approximations of Equations (8) and (9) are valid even for large $\Delta\omega$.

By way of further background, a useful, compact formalism for the treatment of polarization characteristics in optical systems was introduced by R. C. Jones during the years 1941–1956. See, Jones, R. C., "A new calculus for the treatment of optical systems. I. Description and discussion of the calculus," J. Optical Soc. Am., 31, 1941, pages 488–493; "A new calculus for the treatment of optical systems. II. Proof of three general equivalence theorems," J. Optical Soc. Am., 31, 1941, pages 493–499; "A new calculus for the treatment of optical systems. III. The Sohncke theory of optical activity," J. Optical Soc. Am., 31, 1941, pages 500–503; "A new calculus for the treatment of optical systems. IV.," J. Optical Soc. Am., 32, 1942, pages 486–493; "A new calculus for the treatment of optical systems. V. A more general formulation and description of another calculus," J. Optical Soc. Am., 7, 1947, pages 107–110; "A new calculus for the treatment of optical systems. VI. Experimental determination of the matrix," J. Optical Soc. Am., 37, 1947, pages 110–112; "A new calculus for the treatment of optical systems. VII. Properties of the N-matrices," J. Optical Soc. Am., 38, 1948, pages 671–685; "A new calculus for the treatment of optical systems. VIII. Electromagnetic theory," J. Optical Soc. Am., 46, 1956, pages 126–131. A synopsis of the Jones calculus is presented in Chapter 4 of Kliger, D. S., Lewis, J. W., and Randall, C. E., Polarize light in optics and spectroscopy, Academic Press, San Diego, 1990. Generally, Jones derived an explicit expression for experimentally determining the forward transmission matrix M of an unknown, linear, time-invariant optical device (Jones, R. C., "A new calculus for the treatment of optical systems. VI. Experimental determination of the matrix," J. Optical Soc. Am., 37, 1947, pages 110–112). This restriction precludes optical devices that generate new optical frequencies different from those of the incident light beam.

Also, a Jones vector cannot be employed to represent a partially polarized field. However, this is not a practical limitation, since a light beam from an optical source can be completely polarized by a linear polarizer.

Furthermore, a Jones matrix cannot represent a depolarizing optical DUT. However, depolarizing effects can be eliminated by using a quasi-monochromatic optical source with a sufficiently long coherence length.

Subject to these constraints, the Jones calculus can express an input optical electric field by a one-by-two complex column field vector $\hat{v}$ which completely specifies the phase and state of polarization of a light beam, such as the light beam shown in FIG. 6. The two complex elements of this vector represent the amplitudes and phases of the x and y components of the optical electric field, respectively. Measurement of the two optical phases is difficult because an optical interferometer is required; however, measurement of the relative phase between the x and y components is relatively easy. A Jones vector which contains only relative phase information will be referred to as a truncated Jones vector v. $\hat{v}$ and v are related by an optical phase term, i.e., there exists an angle $\theta$ such that $$\hat{v} = e^{i\theta} v. \tag{10}$$

An optical DUT, such as the optical DUT 30, is represented by a complex two-by-two matrix. The effect of an optical DUT on an input optical electric field is found by multiplying the field vector by the matrix representing the optical DUT to obtain an output optical electric field vector which represents the transmitted portion of the light beam $\Delta l$.

To keep track of the full phase of the optical field requires that a transmission matrix $\hat{M}$ be used, that includes the effects of any phase delay through the optical DUT 30. Again, measurement of $\hat{M}$ is difficult because it requires the use of an interferometer, while measurement of a truncated Jones matrix M, which contains only relative phase information, is relatively easy. As in the case of the Jones vectors, the matrices $\hat{M}$ and M are related by an optical phase term:

$$\hat{M} = e^{i\theta} M. \tag{11}$$

In general, the Jones matrix representing an optical device or network may be a function of the optical radian frequency $\omega = 2\pi c/\lambda$, where c is the speed of light and $\lambda$ is the wavelength. As described in the following Equation (12), the frequency dependence of the Jones matrix of an optical device or network can lead to an output Jones vector which changes as the optical frequency is varied, even when the input Jones vector is held constant:

$$\hat{V}_{out}(\omega) = \hat{M}(\omega)\hat{v}_{in} \text{ and } v_{out}(\omega) = M(\omega)v_{in}. \tag{12}$$

It has been shown that for any network which exhibits no polarization dependent loss, there exist two input Jones vectors $z_k$ such that the output Jones vectors $w_k = M(\omega)z_k$ (for k=1, 2) have no dependence to first order over a small range of optical frequency; See, C. D. Poole and R. E. Wagner, "Phenomenological approach to polarization dispersion in long single-mode fibers," Elect. Lett., 22, 1986, pp. 1029–1030. The lack of first-order frequency dependence in $w_k$ is expressed as follows:

$$\frac{dw_k}{d\omega} = \frac{dM(\omega)}{d\omega} z_k = 0, \tag{13}$$

where k=1, 2 is assumed throughout. When Equation (9) is satisfied, $z_1$ and $z_2$ are called the input principal states of polarization, and $w_1$ and $w_2$ are called the output principal states of polarization. The output principal states of polarization are associated with two group delays $\tau_{g,1}$ and $\tau_{g,2}$, meaning that the absolute phases $\phi_k$ of the output principal states of polarization vary with frequency such that $d\phi_k/d\omega = \tau_{g,k}$. The input and output principal states of polarization are in general functions of the optical frequency. The polarization mode group delay difference $\tau_{PMD} = |\tau_{g,1} - \tau_{g,2}|$ is also, in general, a function of the optical frequency.

One embodiment of the method in accordance with the invention for determining polarization mode dispersion in the optical DUT 30 is based on specification of the input optical electric field Jones vectors for three known states of polarization at each of two wavelengths of the light beam 1, performing intensity measurements on the transmitted portion of the light beam $\Delta l$ needed to derive the output optical electric field Jones vectors at each of the two wavelengths, and computing the Jones matrices for the optical DUT 30 from the input and output Jones vectors. Thereafter, the method of the invention determines the polarization mode dispersion in the optical DUT 30 from the computed Jones matrices. This provides an accurate determination of the polarization mode dispersion in the optical DUT 30, as well as minimizes the number of actual measurements that must be performed, and, therefore, is rapid and convenient. The polarization mode dispersion determination method of the invention will now be described in more detail.

One embodiment of the method in accordance with the invention determines the polarization mode dispersion in the transmission of the optical DUT 30 shown in FIG. 6 in response to three sequential known states of polarization of the light beam at each of two wavelengths. The output of the optical source 40 is connected to the input of the polarization synthesizer 50 which is used to sequentially transform the state of polarization of the beam of light generated by the optical source 40 at each of the two wavelengths to three sequential predetermined polarization states, for example, horizontal, 60-degree, and 120-degree linear polarization. The three states of polarization need not be of the same intensity.

The output of the polarization synthesizer 50 is connected to the input of the optical DUT 30. The optical DUT 30 has an unknown transmission Jones matrix at each of the two wavelengths. As will be shown, polarization mode dispersion in the optical DUT 30 can be determined from the Jones matrices once the matrices are determined. In accordance with the method of the invention, the unknown Jones matrices are computed from the measured responses (Stokes parameter measurements) of the optical DUT 30 to the three sequential predetermined polarization states of the light beam 1 at each of the two wavelengths.

Figure 8:
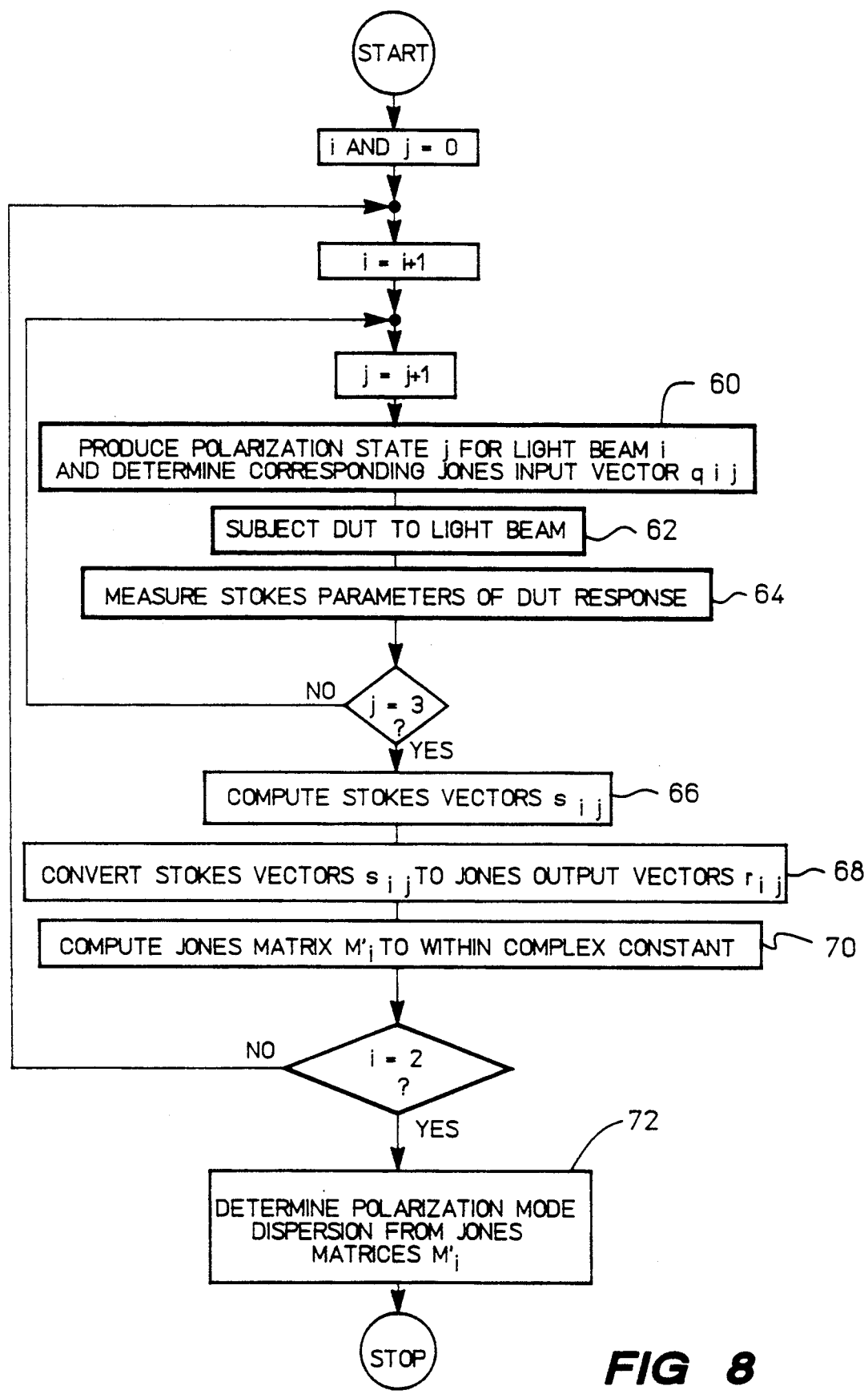
FIG. 8 is a flow chart of one embodiment of the method in accordance with the invention for determining polarization mode dispersion in an optical device under test.

Considered in more detail, one embodiment of the method for determining the polarization mode dispersion in the optical DUT 30 is shown in FIG. 8. As indicated above, the one embodiment of the method in accordance with the invention for determining polarization mode dispersion in the optical DUT 30 employs Jones calculus. Use of Jones calculus to determine the polarization mode dispersion in the optical DUT 30 requires that the light beam 1 at each of the two wavelengths fed to the optical DUT be of a known state of polarization. Nevertheless, the optical source 40 can be any source of optical energy for generating a light beam 1 at each of the two wavelengths, and the beam of light generated by the optical source can have any polarization, including a beam which is not linearly polarized such as an elliptically polarized beam or an unpolarized beam. This is because the polarization synthesizer 50 assures that the light beam generated by the optical source 40 is of a known polarization state when the light beam 1 exits the polarization synthesizer. If, however, the optical source 40 generates linearly polarized light beams at each of the two wavelengths, selection of the optical source and the sequential settings of the polarization synthesizer 50 must be such that the polarization state of the beams generated by the optical source does not result in complete filtering (i.e., cancellation) of the beams by one of the settings of the polarization synthesizer.

In accordance with the one embodiment of the method of the invention for determining polarization mode dispersion in the optical DUT 30, the polarization synthesizer 50 is sequentially set to three predetermined polarization settings so that the light beam 1 fed to the optical DUT at each of the two wavelengths has three predetermined polarization states at each wavelength, as indicated by the numeral 60 shown in FIG. 8. For example, the polarization synthesizer 50 can be set to sequentially produce linear polarization states at 0°, 60°, and 120°. Because the polarization states are known, and because these polarization states are linear, three input optical electric field Jones vectors can be specified at each wavelength, as indicated by the step 60 shown in FIG. 8, namely:

$$q_{ij} = \begin{bmatrix} \cos \theta_{ij} \\ \sin \theta_{ij} \end{bmatrix}, \quad (14)$$

where i=1, 2 corresponding to the two wavelengths, j=1, 2, 3 corresponding to the three sequential settings of the polarization synthesizer 50, and $\theta_{ij}$ is the angle corresponding to the polarization state at the present setting.

The light beam 1 having the three sequential predetermined input states of polarization at each of the two wavelengths is fed either through the atmosphere (open beam) or through the optical fiber 51 to the optical DUT 30, as indicated by the numeral 62 shown in FIG. 8. The optical DUT 30 affects the polarization state of the light beam produced by each of the three sequential predetermined settings of the polarization synthesizer 50 at each of the two wavelengths.

As mentioned above, polarization mode dispersion in the optical DUT 30 cannot be accurately determined using Jones calculus if the optical DUT is depolarizing. However, the effects of a depolarizing optical DUT 30 can be eliminated by using an optical source 40 having a very narrow spectral line width, that is, by using an optical source which is quasi-monochromatic with a sufficiently long coherence length, or, alternatively, an optical source 40 having a broad spectrum in combination with a monochrometer.

The polarization mode dispersion of the optical DUT 30 can be determined from the three sequential known input electric field Jones vectors given by Equation (14) and the three measured responses of the optical DUT to the three sequential predetermined input states of polarization, at each of the two wavelengths as follows. In the case of transmission through the optical DUT 30, the respective polarization states of the light beam 1 produced by the polarization synthesizer 50 at each of the two wavelengths sequentially impinge on the optical DUT. The three resulting polarization states of the portion of the light beam Δ1 at each of the two wavelengths sequentially exit the optical DUT 30 and are fed either open beam or by the optical fiber 52 to the optical polarization meter 10. As indicated by the numeral 64 shown in FIG. 8, the optical polarization meter 10 measures the Stokes parameters, as described earlier, from which the polarization state of each of the three sequential polarization states of the light beam Δ1 produced by the optical DUT 30 can be calculated.

The optical polarization meter 10 measures the Stokes parameters of the three sequential polarization states of the light beam Δ1 received by the optical polarization meter and computes the corresponding Stokes vectors, as indicated by the numeral 66 shown in FIG. 8. This is accomplished by measuring the signals H, T, C, and F shown in FIG. 7 for each received polarization state of the light beam Δ1 at each of the two wavelengths. The Stokes vectors for the three sequential predetermined input polarization states are:

$$s_{ij} = \begin{pmatrix} s_{ij0} \\ s_{ij1} \\ s_{ij2} \\ s_{ij3} \end{pmatrix} \begin{bmatrix} 1 & 0 & 0 & 0 \\ -1 & 2 & 0 & 0 \\ -1 & 0 & 2 & 0 \\ -1 & 0 & 0 & 2 \end{bmatrix} \begin{pmatrix} H_{ij} \\ T_{ij} \\ C_{ij} \\ F_{ij} \end{pmatrix}, \quad (15)$$

where i=1, 2 corresponds to the two wavelengths, j=1, 2, 3 corresponds to the three sequential states of polarization of the light beam Δ1 due to the three sequential predetermined settings of the polarization synthesizer 50, the matrix is the instrument matrix of the optical polarization meter 10 specified by the presence of the optical elements 14–17, and H, T, C, and F are the electrical signals produced by the photodetectors 18–21. In practice, the instrument matrix may vary from that shown in Equation (15) as a result of imperfections in the optical elements 14–17 and uneven distribution of the light beam Δ1 among the photodetectors 18–21 and, therefore, must be determined.

Jones calculus can be employed to determine the polarization mode dispersion of the optical DUT 30 only if relative phase information between the x and y components of the optical electric field are present. The method of the invention for determining polarization mode dispersion recognizes that the Stokes vectors $s_{ij}$ contain relative phase information between the x and y components of the optical electric field. Therefore, the Stokes vectors can be converted to output electric field Jones vectors for each of the three sequential settings of the polarization synthesizer 50 at each of the two wavelengths, as indicated by the numeral 68 shown in FIG. 8, as described in aforementioned U.S. patent application Series Code/Ser. No. 07/755,931. Also, the desired matrix M can be computed, as indicated by the numeral 70 shown in FIG. 8, as described in aforementioned U.S. patent application Series Code/Ser. No. 07/755,931.

Considering that measurements are performed in the presence of noise and small systematic errors, the most accurate calculation of the matrix M will result when the three sequential predetermined input states of polarization at each of the two wavelengths are as far as possible apart from one another on the Poincare sphere. This leads to the following preferred selection of the three sequential input states of polarization.

Since it is easier to generate linear states of polarization at any wavelength than it is to generate elliptical polarization states, the input states of polarization are preferably generated by successively inserting three linear polarizers into a light beam which is approximately unpolarized or approximately circularly polarized. This constrains the powers of the three sequential input states of polarization to be roughly equal and yields most accurate measurement. Accordingly, the linear polarizers 50a, 50b, and 50c at relative angles 0°, 60°, and 120° are preferably selected so that the three sequential predetermined input states of polarization specified by the Jones input vectors $\hat{v}_{in}$ will be located at 120° intervals on a great circle on the Poincare sphere, i.e., as far apart as possible.

A few techniques from linear algebra needed to understand the determination of polarization mode dispersion in the optical DUT 30 from the matrix M in accordance with one embodiment of the method of the invention will now be briefly described. Given an n-by-n matrix A, a nonzero vector b of dimension is said to be an eigenvector of A corresponding to the eigenvalue c if $$cb = Ab \qquad (16)$$

The eigenvalues $c_n$ of the matrix A are given by the roots of the characteristic equation $\det(A - cI) = 0$, where I is the identity matrix of the same dimension as A. It is seen from the defining Equation (16) that the matrix $A' = aA$, where a is a complex constant, has eigenvalues ac. It can be shown that the Jones matrix representing any optical device or network which is not a perfect polarizer can be represented by a nonsingular complex two-by-two matrix, and that such a matrix has two (generally complex, not necessarily distinct) nonzero eigenvalues $c_1$ and $c_2$.

Now, to determine polarization mode dispersion in an optical device or network such as the optical DUT 30 shown in FIG. 6, the tunable optical source 40 is connected to the input of the polarization synthesizer 50 which is used to transform the state of polarization of the light beam generated by the optical source to three known states of polarization, for example, horizontal, 60-degree, and 120-degree linear. The output of the polarization synthesizer 50 is directed to the input of the optical DUT 30 through the short length of single-mode optical fiber 51 which is assumed to introduce negligible polarization mode dispersion.

The linear optical properties of the optical DUT 30 are represented by the Jones matrix $M(\omega)$. The output of the optical DUT 30 is directed to the polarization meter 10 through a short length of single-mode optical fiber 52 which again is assumed to introduce negligible polarization mode dispersion. Alternatively, the optical DUT 30 can be placed between the polarization synthesizer 50 and the polarization meter 10, and the light exiting the synthesizer can be substantially collimated to propagate through the optical DUT and into the polarization meter without the need for optical fiber waveguides.

At any given optical frequency $\omega_n$, the polarization synthesizer 50 produces three stimulus states of polarization, and the optical polarization meter 10 measures the corresponding three response states of polarization. Using the techniques described in the aforementioned U.S. patent application Series Code/Ser. No. 07/755,931, the truncated Jones matrix $M(\omega_n)$ is determined based on these measurements at each of the two wavelengths.

Consequently, having determined the matrix M at the step 70 shown in FIG. 8, the polarization mode dispersion in the optical DUT 30 can be determined, as indicated by the numeral 72 shown in FIG. 8, as follows.

It is possible to generalize the concept of the principal states of polarization to include optical devices and networks which exhibit polarization dependent transmission, i.e., in which the optical power transmitted through the devices or networks is dependent on the input state of polarization. In the case of polarization independent transmission, the output principal states of polarization are represented by the Jones vectors $w_k = M(\omega)z_k$ (for $k = 1, 2$) which exhibit no frequency dependence to first order over a small range of optical frequency. In the more general case of optical devices and networks with polarization dependent loss or gain, a pair of input Jones vectors $z_1$ and $z_2$ are applied which, after transmission through the network, produce output Jones vectors $w_k = M(\omega)z_k$ (for $k = 1, 2$) whose directions have no frequency dependence to first order over a small range of optical frequency. (A family of vectors in the same direction are all identical within a multiplicative constant.) $z_k$ and $w_k$ are then the generalized input and output principal states of polarization, which again are functions of the optical frequency.

The lack of change in the output Jones vector direction over a small frequency range is expressed by the following equation:

$$w_k(\omega + \Delta\omega) = \frac{\sigma(\omega + \Delta\omega)}{\sigma(\omega)} w_k(\omega) \qquad (17)$$

for $z_k(\omega + \Delta\omega) = z_k(\omega)$, where the field transmission amplitude $\sigma(\omega)$ is a real function of $\omega$ which accounts for the variation in transmission which can arise when the network exhibits polarization dependent loss or gain.

The generalized principal states of polarization described by Equation (17) are again associated with two group velocities $\tau_{g,1}$ and $\tau_{g,2}$, i.e., the absolute phases $\phi_k$ of the output principal states of polarization vary with frequency such that $d\phi_k/d\omega = \tau_{g,k}$.

In order to add absolute phase information to Equation (17), a phase term must be incorporated to describe how the optical phase of the output principal state $w_k$ varies with frequency. By definition of the group delay, this variation is given by $\exp[i\tau_{g,k}(\omega - \omega_0)]$ to first order. In terms of the full Jones vectors $w_k$, Equation (17) can then be rewritten as:

$$\hat{w}_k(\omega + \Delta\omega) = \frac{\sigma(\omega + \Delta\omega)}{\sigma(\omega)} e^{i\tau_{g,k}\Delta\omega}\hat{w}_k(\omega) \qquad (18)$$

for $\hat{z}_k(\omega + \Delta\omega) = \hat{z}_k(\omega)$.

The similarity between Equation (18) and Equation (9) is apparent, the only difference being that Equation (18) describes the behavior of two output principal state Jones vectors, each of which propagates through the network with group delay $\tau_{g,1}$ or $\tau_{g,2}$.

Equation (18) can be combined with the input-output relation $w_k = M(\omega)z_k$ to obtain $$\hat{M}(\omega + \Delta\omega)\hat{z}_k(\omega) = \frac{\sigma(\omega + \Delta\omega)}{\sigma(\omega)} e^{i\tau_{g,k}\Delta\omega} \hat{M}(\omega)\hat{z}_k(\omega). \quad (19)$$

A new pair of matrices is now defined:

$$\hat{M}'(\omega,\Delta\omega) = \hat{M}^{-1}(\omega)\hat{M}(\omega + \Delta\omega) \text{ and} \quad (20)$$

$$M'(\omega,\Delta\omega) = M^{-1}(\omega)M(\omega + \Delta\omega).$$

Premultiplying Equation (19) by $\hat{M}^{-1}(\omega)$ then yields:

$$\hat{M}'(\omega,\Delta\omega)\hat{z}_k(\omega) = \frac{\sigma(\omega + \Delta\omega)}{\sigma(\omega)} e^{i\tau_{g,k}\Delta\omega} \hat{z}_k(\omega). \quad (21)$$

$\hat{M}'(\omega, \Delta\omega)\hat{z}_k(\omega)$ is related to $M'(\omega, \Delta\omega)z_k(\omega)$ by a phase factor $\theta$ which is a function of both $\omega$ and $\Delta\omega$, so Equation (21) can be written as:

$$M'(\omega,\Delta\omega)z_k(\omega) = \frac{\sigma(\omega + \Delta\omega)}{\sigma(\omega)} e^{i[\tau_{g,k}\Delta\omega + \theta(\omega,\Delta\omega)]} z_k(\omega).$$

By comparison with Equation (16), it is observed that the input principal states of polarization $z_k(\omega)$ are eigenvectors of $M'(\omega, \Delta\omega)$ associated with the eigenvalues $c_k$ given by:

$$c_k = \frac{\sigma(\omega + \Delta\omega)}{\sigma(\omega)} e^{i[\tau_{g,k}\Delta\omega + \theta(\omega,\Delta\omega)]}. \quad (23)$$

Any complex number $x$ can be written in the form $x = a\, e^{ib}$, where $a$ and $b$ are real numbers and $b$ is defined to be the argument of $x$, i.e., $Arg[x] = b$. Finally, the polarization mode dispersion group delay difference $\tau_{PMD} = \tau_{g,1} - \tau_{g,2}$ can be expressed in terms of $\Delta\omega$ and the arguments of the eigenvalues of $M'(\omega, \Delta\omega)$ as follows:

$$\tau_{PMD} = |\tau_{g,1} - \tau_{g,2}| = \frac{|Arg[c_1] - Arg[c_2]|}{\Delta\omega}, \quad (24)$$

as indicated by the numeral 72 shown in FIG. 8.

When using the method of this invention to measure the polarization mode dispersion in an optical device or network such as the optical DUT 30 shown in FIG. 6, the apparatus described in FIG. 6 is used to measure the Jones matrix $M'(\omega)$ of the optical DUT at a series of at least two optical frequencies $\omega_n$, $n = 1, 2, \ldots N$. In the optical frequency range of $\omega_n$ to $\omega_{n+1}$, the generalized input principal states of polarization are given by the eigenvectors of $M'(\omega_n, \omega_{n+1} - \omega_n)$, and the polarization dispersion mode group delay difference is given by Equation (24), where $c_k$ are the eigenvalues of the same matrix. If N is greater than two, then the principal states of polarization and group delay differences are found for each successive optical frequency interval, so the frequency dependence of both the input and output principal states of polarization and the frequency dependence of the group delay difference can be found in a straightforward manner. As the Jones matrix for each frequency is found as part of the measurement process, the output principal states of polarization are simply found to be $w_{k,n} = M(\omega_n)z_{k,n}$.

Figure 9:
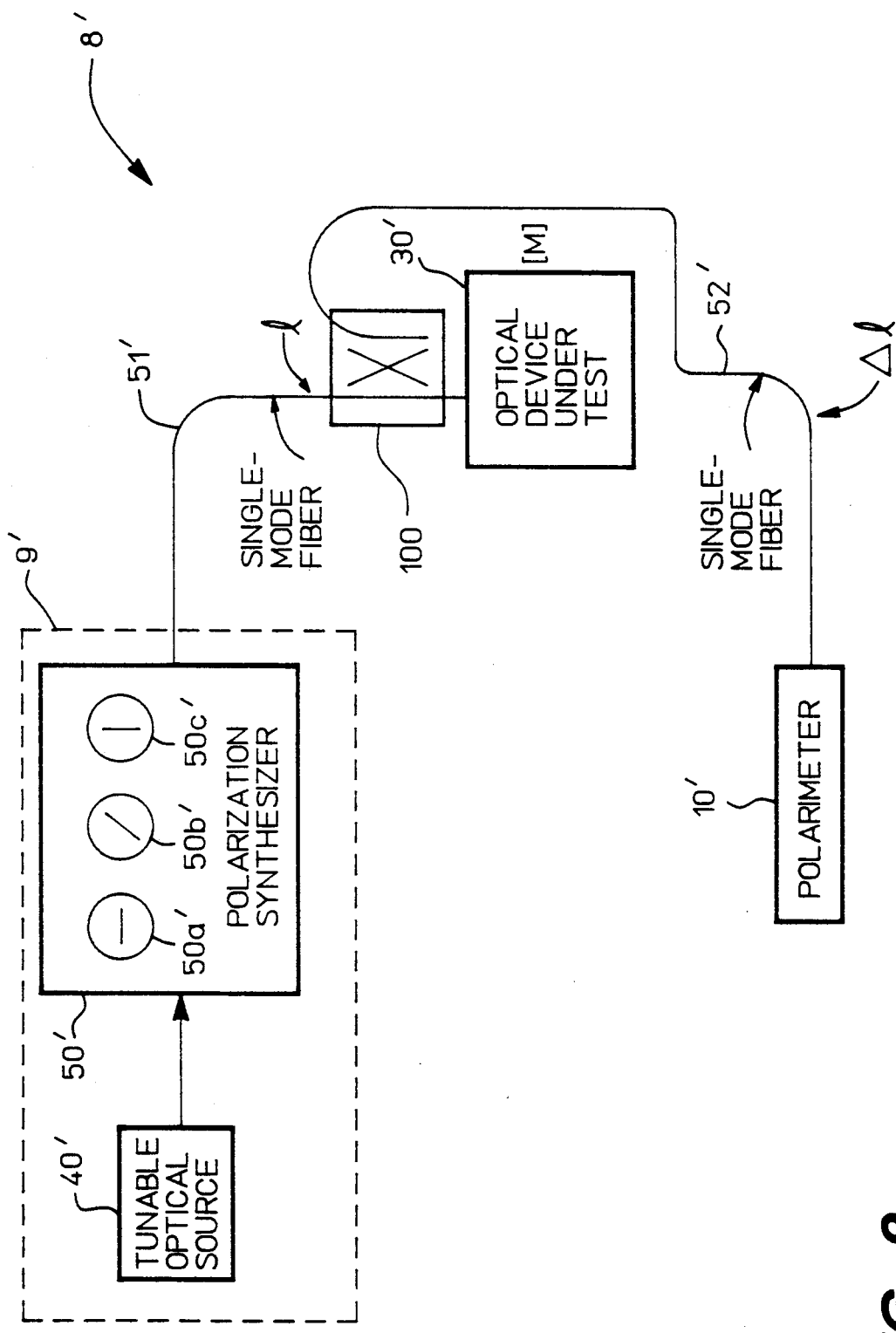
FIGS. 9 and 10 are schematic diagrams similar to FIG. 6, in which the instrument is configured for determining the polarization mode dispersion in an optical device under test in accordance with the invention based on reflection measurements.

Polarization mode dispersion can be determined based on reflection measurements instead of transmission measurements using the instrument shown in FIG. 9. Elements 9', 10', 30', 51', and 52' shown in FIG. 9 correspond to the elements 9, 10, 30, 51, and 52, respectively, shown in FIG. 6. The only difference is that the light beam 1 is fed to the optical DUT 30' by a directional optical coupler 100, and the portion of the beam fed to the optical polarization meter 10' is a reflected beam, rather than a beam transmitted by the optical DUT 30 to the optical polarization meter 10, as shown in FIG. 6. Consequently, both transmission and reflection measurements are considered to be within the scope of the method for determining polarization mode dispersion in accordance with the invention.

In summary, the polarization mode dispersion in the optical DUT 30 or 30', can be determined as shown in FIG. 8. In each case, the matrix M' is determined.

Finally, in certain measurement topologies, many devices and/or networks exhibiting polarization mode dispersion may have been concatenated to form a chain. It may be desired to measure the polarization mode dispersion of a particular optical device or network alone, without interference of the polarization mode dispersion in the other devices or networks in the chain. It will now be shown how this can be accomplished by using the method of this invention.

Figure 10:
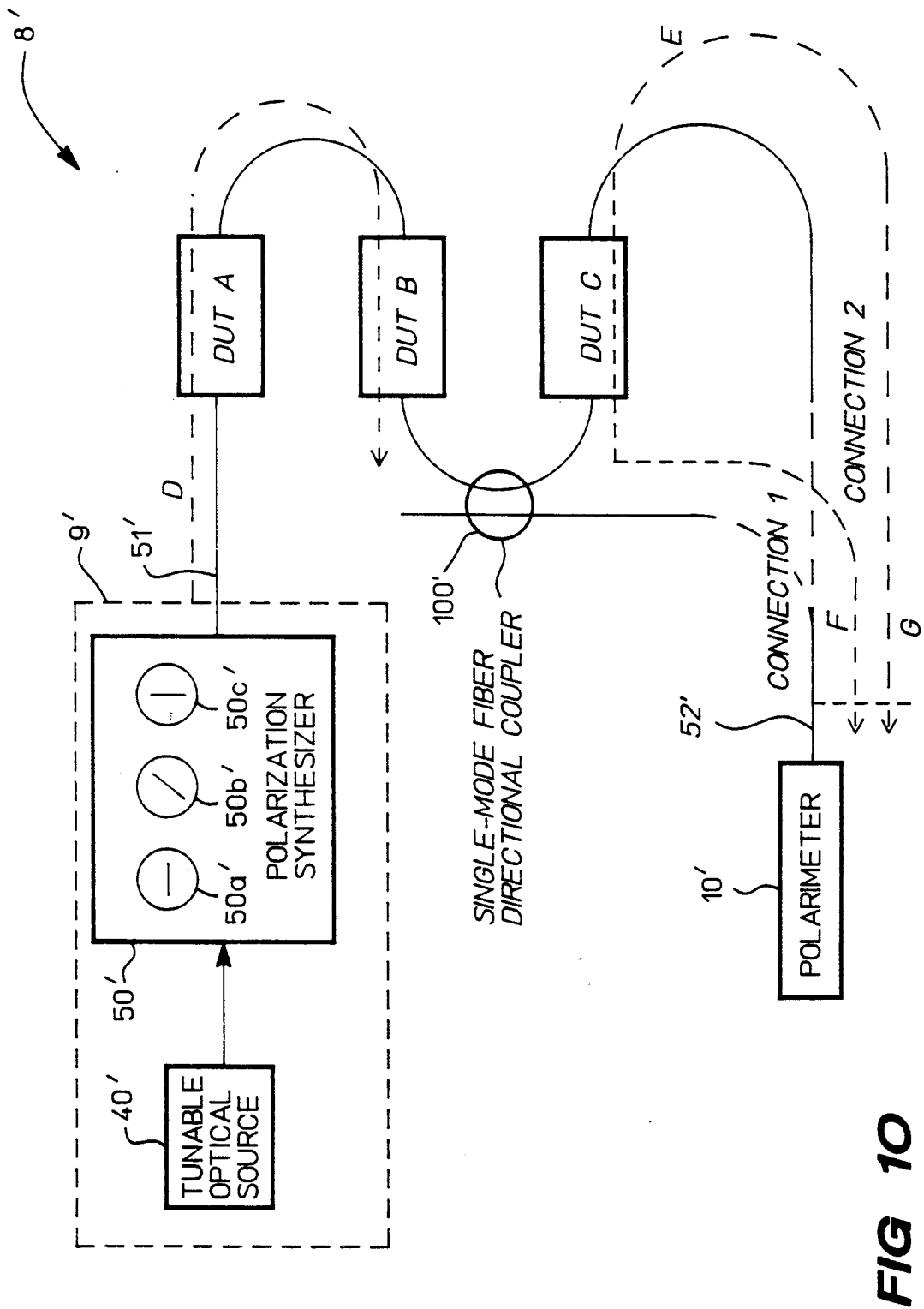

FIG. 10 shows a chain of three dispersive optical devices or networks DUT A, DUT B, and DUT C. The dashed arrows indicate the Jones matrices associated with the indicated paths. Matrix D represents the polarization transformation through DUT A and DUT B and into a directional coupler 100'. Matrix E represents the polarization transformation through DUT C (the optical device or network of interest) to connection 2. Matrices F and G represent transformations through connections 1 and 2, respectively.

To find the polarization mode dispersion of DUT C, the Jones matrix through the chain must be determined from some signal insertion point to points immediately before and after DUT C. The Jones matrices must be determined at each of at least two optical wavelengths, and exactly two frequencies $\omega_1$ and $\omega_2$ will be considered in this example for simplicity. The system is initially configured so that connection 1 is effected, and then the matrix product FD is determined at the two optical wavelengths. The system is then configured so that connection 2 is effected, and then the matrix product GED is determined at the same two wavelengths. It is assumed that the polarization mode dispersion associated with the connecting optical fibers (e.g., in F and G) is negligible compared to the polarization mode dispersion in DUT C. This assumption implies that $F(\omega_1) \simeq F(\omega_2)$ and $G(\omega_1) \simeq G(\omega_2)$.

Consider the following product of the measured matrices and their inverses:

$$[FD(\omega_2)]^{-1}[FD(\omega_1)] [GE(\omega_1)D(\omega_1)]^{-1} [GE(\omega_2)D(\omega_2)] = \quad (25)$$

$$D^{-1}(\omega_2)E^{-1}(\omega_1)E(\omega_2)D(\omega_2) = M''.$$

Given a nonsingular matrix R, the matrix $Q' = R^{-1}Q$ R is said to be similar to Q. It can be shown that similar matrices have the same eigenvalues. Letting $D(\omega_2)$ take the place of R, it can be seen from Equation (25) that $M''$ is similar to $M' = E^{-1}(\omega_1) E(\omega_2)$. Using $\Delta\omega = \omega_2 - \omega_1$ in Equation (24) with the eigenvalues $c_k$ of $M''$, $\tau_{PMD}$ is obtained for DUT C alone, independent of the dispersive effects of other elements in the chain.

To isolate the dispersive effects of one element in a chain, it is sufficient to measure at two wavelengths the Jones matrices from some signal insertion point to a point immediately before the element of interest, and from the same insertion point to a point immediately after the element of interest. Denoting the two optical frequencies by the subscripts 1 and 2, the Jones matrices from the polarization synthesizer 50' to the point immediately before the element of interest can be named $B_1$ and $B_2$, and the Jones matrices from the polarization synthesizer to the point immediately after the element of interest can be named $A_1$ and $A_2$. The value of $\tau_{PMD}$ associated with the isolated element of interest can then be found from Equation (24), where $c_k$ are the eigenvalues of $M'' = B_2^{-1} B_1 A_1^{-1} A_2$.

Figure 1:
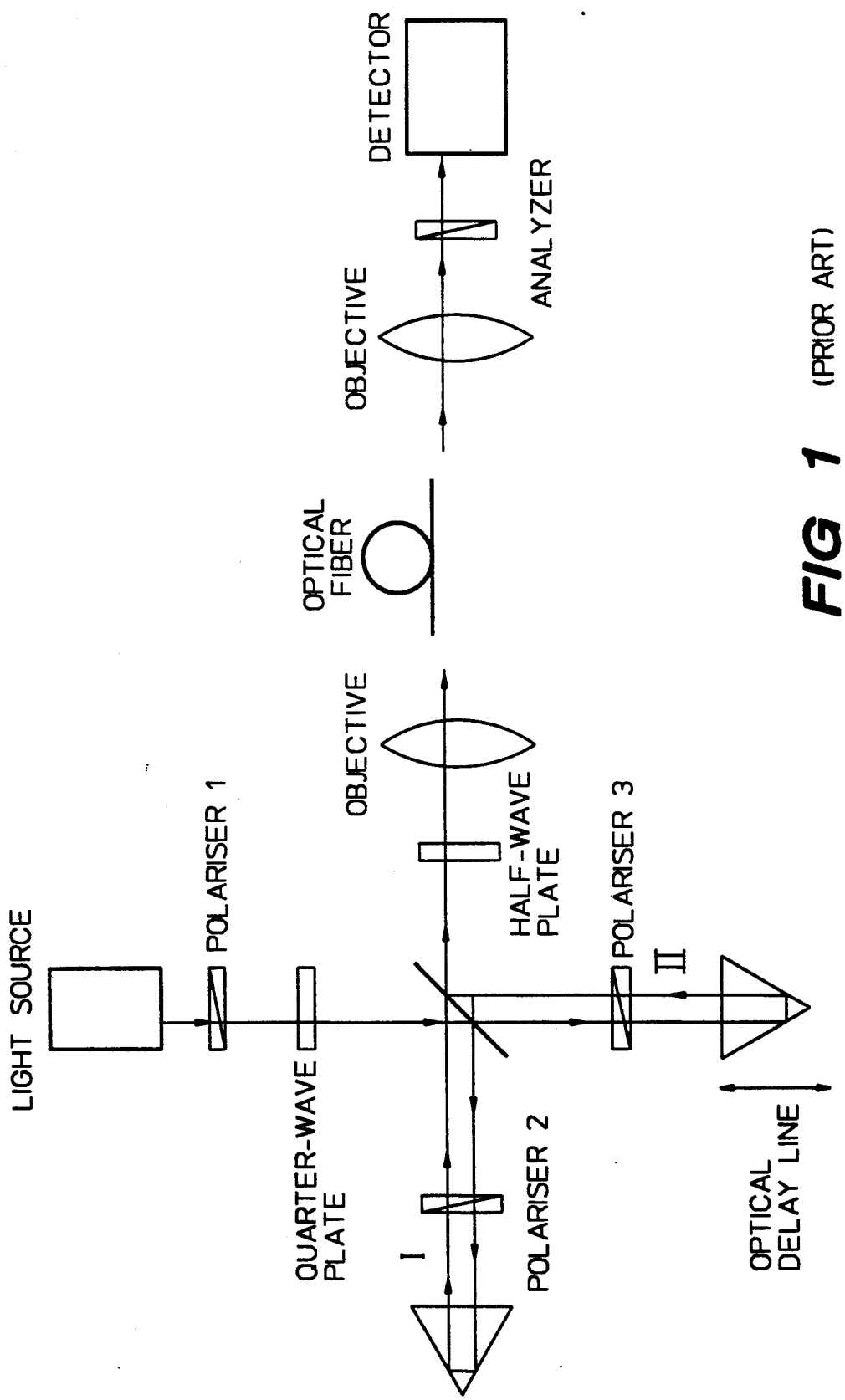
FIG. 1 is a block diagram of a known apparatus for measuring polarization mode dispersion.
Figure 2:
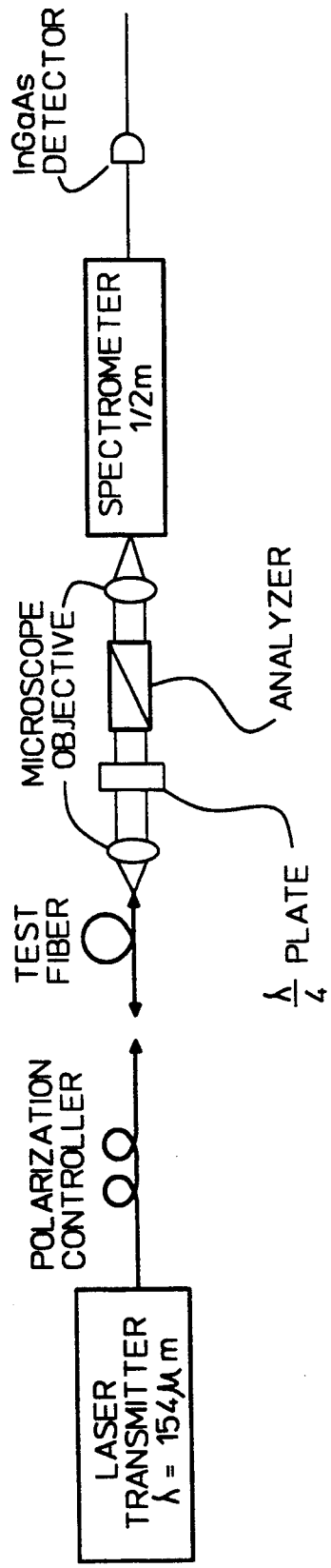
FIG. 2 is a block diagram of another known apparatus for measuring polarization mode dispersion.
Figure 3:
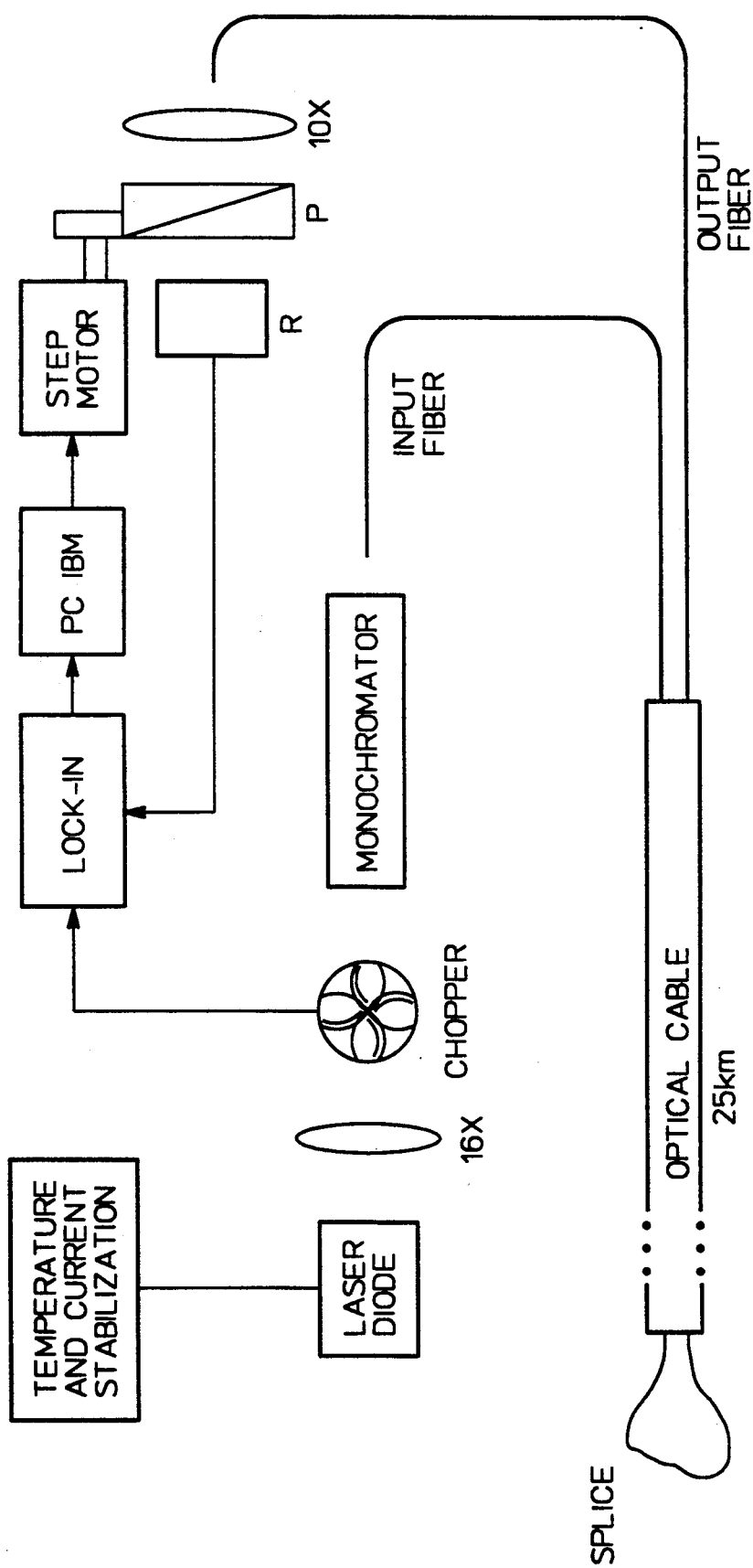
FIG. 3 is a block diagram of yet another known apparatus similar to the apparatus shown in FIG. 2 for measuring polarization mode dispersion.
Figure 4:
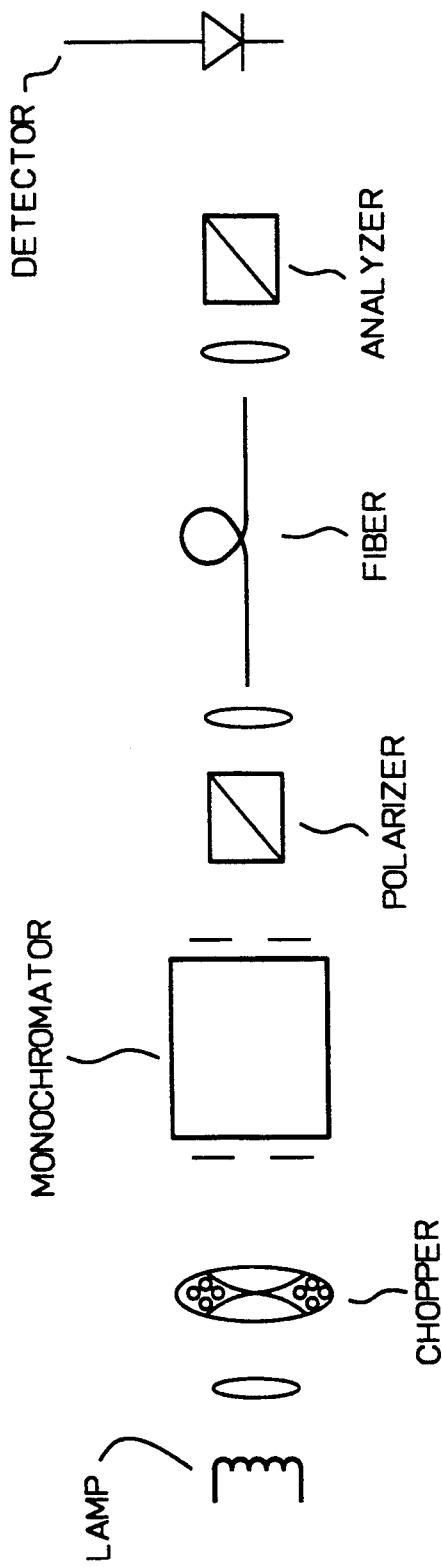
FIG. 4 is a block diagram of another known apparatus for measuring polarization mode dispersion.
Figure 5:
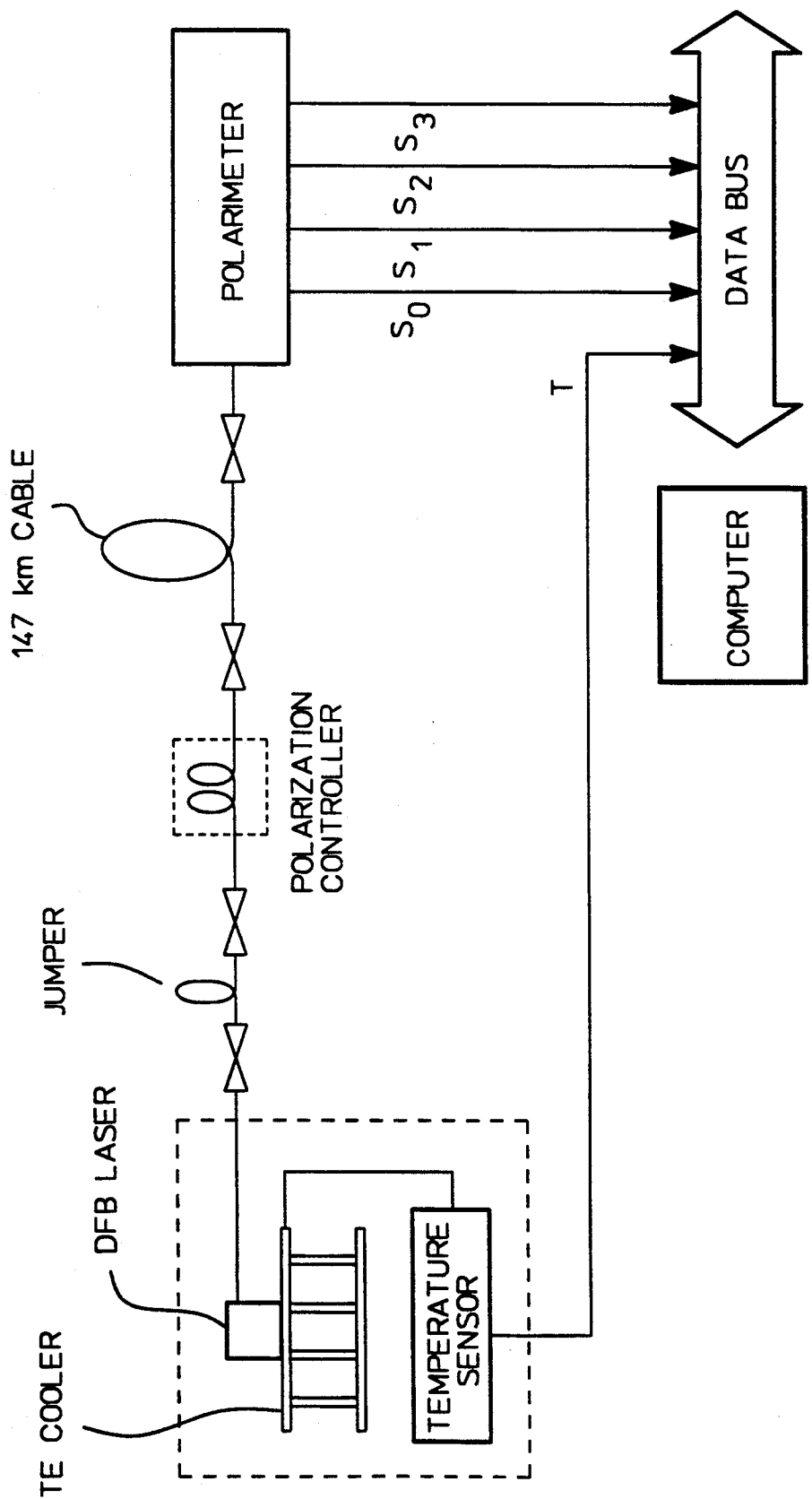
FIG. 5 is a block diagram of yet another known apparatus for measuring polarization mode dispersion.

In summary, polarization mode dispersion can be determined based on transmission through an optical device or network under test, as shown in FIG. 6. Also, polarization mode dispersion in reflection from an optical device or network can be measured by using a beamsplitter or directional coupler to split off part of the reflected signal for analysis, as shown in FIG. 9. The computation of these polarization mode dispersion determinations can be performed by the microprocessor 27 shown in FIG. 2.

The foregoing description is offered primarily for purposes of illustration. While a variety of embodiments of a method and apparatus for measuring polarization mode dispersion in an optical device under test have been disclosed, it will be readily apparent to those skilled in the art that numerous other modifications and variations not mentioned above can still be made without departing from the spirit and scope of the invention as claimed below. For example, the focusing concave mirror 12 shown in FIG. 7 can be replaced by a beam splitter and associated collimating and focusing lenses. Although a preferred embodiment of a polarization meter is shown, any of a variety of polarization measuring devices can be used to measure the Stokes parameters from which the Jones matrices can be determined. Accordingly, the method and apparatus for determining polarization mode dispersion in accordance with the invention are not limited to the specific polarization measuring device described herein. Furthermore, measurement of reflection characteristics can be performed by employing a beam splitter instead of the directional optical coupler 100 or 100' shown in FIGS. 9 and 10, respectively. Accordingly, the scope of the invention can only be ascertained by reference to the appended claims.

What is claimed is:

1. An instrument for determining polarization mode dispersion in an optical network, the instrument comprising:

polarized optical source means for sequentially generating three predetermined states of polarization of a light beam at each of at least two wavelengths and impinging the light beam having each of the three predetermined polarization states at each wavelength on the optical network;

optical polarization measurement man responsive to a portion of each of the three predetermined polarization states of the light beam at each wavelength that is one of a) transmitted by and b) reflected from the optical network for measuring the polarization states produced by the effect of the optical network on each of the three predetermined polarization states of the beam at each wavelength; and means for computing polarization mode dispersion from the measured polarization states produced by the effect of the optical network on each of the three predetermined polarization states of the beam at each wavelength.

2. The instrument as in claim 1 wherein the polarized optical source means comprises an optical source for generating a beam of light at each of the at least two wavelengths, the optical source having an output, and a polarization synthesizer having an input connected to the output of the optical source, the polarization synthesizer comprising optical elements for producing the three predetermined states of polarization of the light beam at each wavelength in response to the beam of light received from the optical source.

3. The instrument as in claim 2 wherein the optical elements of the polarization synthesizer comprise a zero-degree linear polarizer, a 60-degree linear polarizer, and a 120-degree linear polarizer sequentially inserted into a path of the beam of light received from the optical source.

4. An instrument for determining polarization mode dispersion in an optical network, the instrument comprising:

polarized optical source means for sequentially generating three predetermined states of polarization of a light beam at each of at least two wavelengths and impinging the light beam having each of the three predetermined polarization states at each wavelength on the optical network;

optical polarization measurement means responsive to a portion of each of the three predetermined polarization states of the light beam at each wavelength that is one of a) transmitted by and b) reflected from the optical network for measuring the polarization states produced by the effect of the optical network on each of the three predetermined polarization states of the beam at each wavelength, the optical polarization measurement means comprising:

an optical spatial filter which receives and filters each of the three predetermined polarization states of the light beam having an optical axis at each wavelength, such that the intensity distribution of the filtered beam is substantially uniform about the axis of the beam;

means for splitting the filtered light beam into four partial beams;

a first optical element located in the path of a first one of the partial beams and imparting a first polarization thereto;

a second optical element located in the path of a second one of the partial beams and imparting a second polarization thereto;

a third optical element located in the path of a third one of the partial beams and imparting a third polarization thereto;

four photodetectors, each photodetector receiving a different one of the four partial beams and providing a signal indicative of the intensity of that partial beam; and means for computing the polarization of the incident beam of light from the signals provided by the photodetectors; and means for computing polarization mode dispersion from the measured polarization states produced by the effect of the optical network on each of the three predetermined polarization states of the beam at each wavelength.

5. The instrument as in claim 4 wherein the polarized optical source means comprises an optical source for generating a beam of light at each of the at least two wavelengths, the optical source having an output, and a polarization synthesizer having an input connected to the output of the optical source, the polarization synthesizer comprising optical elements for producing the three predetermined states of polarization of the light beam at each wavelength in response to the beam of light received from the optical source.

6. The instrument as in claim 5 wherein the optical elements of the polarization synthesizer comprise a zero-degree linear polarizer, a 60-degree linear polarizer, and a 120-degree linear polarizer sequentially inserted into a path of the beam of light received from the optical source.

7. A method for determining polarization mode dispersion based on one of transmission and reflection responses of an optical device under test, comprising:

producing a polarized light beam having three sequential predetermined states of polarization at each of at least two wavelengths, corresponding to three input optical electric field Jones vectors at each wavelength;

impinging the light beam on the optical device under test;

measuring one of the a) transmission and b) reflection responses of the optical device under test to the light beam for each of the three sequential predetermined polarization states at each wavelength by splitting the light beam to be measured into four beams, passing three of the beams through optical elements, and measuring the intensities of all four beams;

calculating Stokes parameters from the results of the intensity measurements;

converting the Stokes parameters to output optical electric field Jones vectors;

computing a Jones matrix to within a complex constant for the optical device under test from the Jones input and output vectors at each wavelength; and computing the polarization mode dispersion in the optical device under test in relative terms from the matrices.

* * * * *

UNITED STATES PATENT AND TRADEMARK OFFICE
CERTIFICATE OF CORRECTION

Page 1 of 3

PATENT NO. : 5,227,623

DATED : July 13, 1993

INVENTOR(S) : Brian L. Heffner

It is certified that error appears in the above-indentified patent and that said Letters Patent is hereby corrected as shown below:

Col. 2, Line 47, "average delay" should read -- average delay time --

Col. 6, Line 56, "Finally, beam "a" should read -- Finally, beam "a" should read Finally, beam "∠$\vec{K}$a"--.

Col. 7, Line 68, "are real function" should read -- are real functions --

Col. 8, Line 18, "pulse propagates through" should read -- pulse composed of frequency components near $w_0$ as the pulse propagates through --

Col. 8, Line 25, "$y(\omega+\Delta\omega) = \frac{h\ (\omega+\Delta\omega)}{H(\omega)}$" should read -- $y(\omega+\Delta\omega) = \frac{H\ (\omega+\Delta\omega)}{H(\omega)}$ --

Col. 8, Line 48, "Optical Soc. Am., 7, 1947," should read -- Optical Soc. Am., 37, 1947, --

Col. 9, Line 25, "(10) $\hat{v} = e^{i6}$ v." should read -- (10) $\hat{v} = e^{i\theta}$ v. --

Col. 9, Line 36, "transmission matrix M" should read -- transmission matrix $\hat{M}$ --

Col. 9, Line 38 "Again, measurement of M" should read -- "Again, measurement of $\hat{M}$ --

UNITED STATES PATENT AND TRADEMARK OFFICE
CERTIFICATE OF CORRECTION

Page 2 of 3

PATENT NO. : 5,227,623

DATED : July 13, 1993

INVENTOR(S) : Brian L. Heffner

It is certified that error appears in the above-indentified patent and that said Letters Patent is hereby corrected as shown below:

Col. 9, Line 42, "matrices $\hat{M}$ and M" should read -- matrices $\hat{M}$ and M --

Col. 9, Line 45, "(11) $\hat{M} = e^{i6}$ M." should read -- (11) $\hat{M} = e^{i\theta}$ M. --

Col. 9, Line 62, "have no dependence" should read -- have no $\omega$ dependence --

Col. 10, Line 42, "light beam" should read -- light beam $\ell$ --

Col. 11, Line 50, "light beam" should read -- light beam $\ell$ --

Col. 13, Line 31, "dimension is said" should read -- dimension n is said --

Col. 14, Line 39, "frequency range is" should read -- frequency range $\Delta\omega$ is --

Col. 14, Line 61, "vectors $w_k$," should read -- vectors $\hat{w}_k$, --

Col. 15, Line 7, "relation $w_k$" should read -- relation $\hat{w}_k$ --

Col. 16, Line 11, "beam fed" should read -- beam $\Delta\ell$ fed --

UNITED STATES PATENT AND TRADEMARK OFFICE
CERTIFICATE OF CORRECTION

PATENT NO. : 5,227,623
DATED : July 13, 1993
INVENTOR(S) : Brian L. Heffner

It is certified that error appears in the above-indentified patent and that said Letters Patent is hereby corrected as shown below:

Col. 16, Line 19, "DUT 30 or 30," should read -- DUT 30 or 30' --

Col. 17, Line 64, "measurement man" should read -- measurement means --

Signed and Sealed this

Twenty-sixth Day of April, 1994

*Attest:*

BRUCE LEHMAN

*Attesting Officer*  *Commissioner of Patents and Trademarks*